United States Patent [19]
Nishida et al.

[11] Patent Number: 5,681,207
[45] Date of Patent: Oct. 28, 1997

[54] METHOD OF WORKING A HELICAL GEAR BY GRINDING

[76] Inventors: Noriteru Nishida, 9-2-301, Nameishi, 5-chome; Youichi Kobayashi, 407-112, Otemachi, both of Nagasaki-shi, Nagasaki 852, Japan

[21] Appl. No.: 381,935
[22] PCT Filed: Jul. 23, 1993
[86] PCT No.: PCT/JP93/01059
§ 371 Date: May 8, 1995
§ 102(e) Date: May 8, 1995
[87] PCT Pub. No.: WO95/03149
PCT Pub. Date: Feb. 2, 1995
[51] Int. Cl.⁶ .................................................... B24B 15/04
[52] U.S. Cl. ........................ 451/47; 451/48; 451/147; 451/253; 451/275; 409/38; 409/51; 409/57
[58] Field of Search ............................ 451/47, 48, 147, 451/275, 253; 409/57, 38, 51, 50, 42, 43

[56] References Cited

U.S. PATENT DOCUMENTS 4,954,027  9/1990  Faulstich ................................. 409/26

FOREIGN PATENT DOCUMENTS 92333346   6/1991  Japan .
920787888 11/1991  Japan .

*Primary Examiner*—Robert A. Rose
*Assistant Examiner*—George Nguyen
*Attorney, Agent, or Firm*—Flynn, Thiel, Boutell & Tanis, P.C.

[57] ABSTRACT

In forming a helical gear by grinding with a grindstone, the modification accuracy of crowing etc. is improved in such a way that the inequality $\beta > \gamma c$ is established wherein $\beta$ is the helix angle of the helical gear to be ground and $\gamma c$ is the inclination angle of the grindstone, and the profile of the grindstone is designed to have a vertical angle which is equal to the inclination angle ($\gamma c$) of the grindstone.

7 Claims, 11 Drawing Sheets

FIG.5(a) FIG.5(b) FIG.5(c)
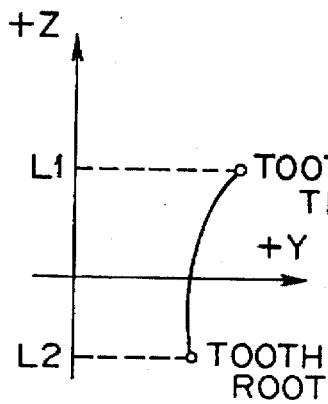
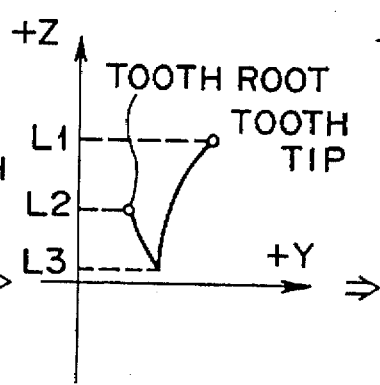
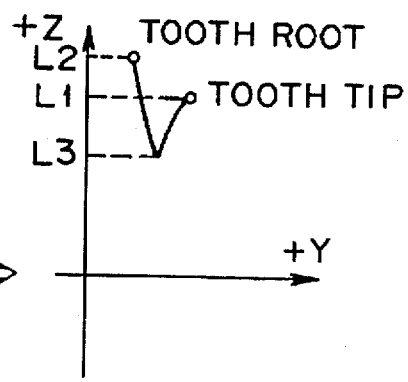
FIG.6
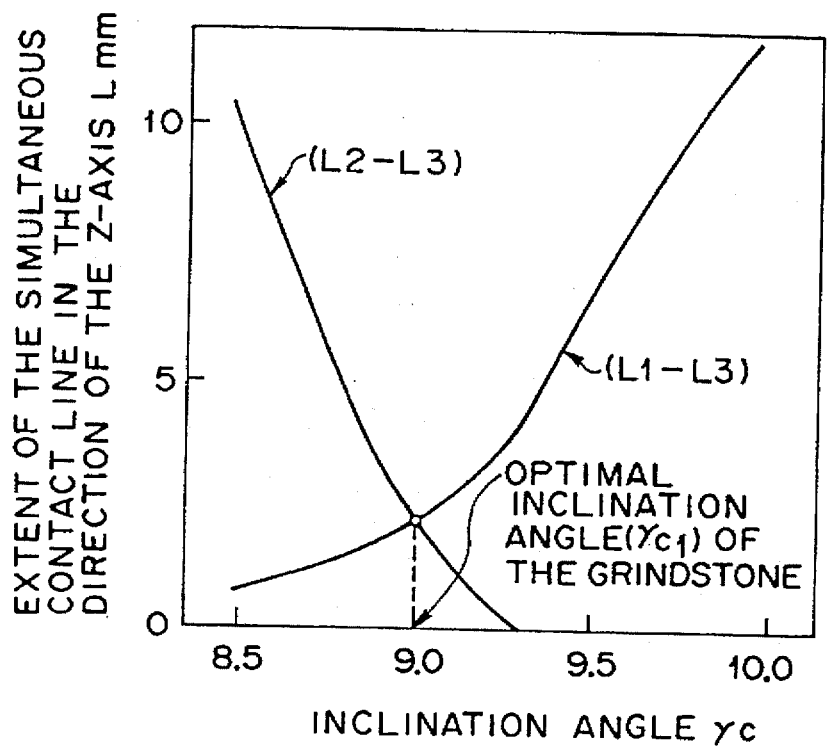

FIG. 17

[Formula 1]

$$\Psi = \{-B + (B^2 - AC)^{1/2}\}/A \quad (1)$$

wherein:

$A = -r_g^2\cos\gamma_c\{1 + \Gamma\tan(\Gamma + \delta)\} - R_w\tan\gamma_w\{\sin\gamma_c(R_w + R_c) + 2R_w\tan\gamma_w\cos\gamma_c\}$ $B = r_g^2\cos\gamma_c\{\tan(\Gamma + \delta) - \Gamma\} + R_w\tan\gamma_w\{\sin\gamma_c(R_w + R_c) + R_w\tan\gamma_w\cos\gamma_c\}\tan(\Gamma + \delta)$ $C = -2[\gamma_g\{\cos\gamma_c(R_w + R_c)/\cos(\Gamma + \delta) - \gamma_g\cos\gamma_c(1 + \Gamma\tan(\Gamma + \delta)) + R_w\tan\gamma_w\sin\gamma_c/\cos(\Gamma + \delta)\} - R_w\tan\gamma_w\sin\gamma_c(R_w + R_c)]$

[Formula 2]

$$\gamma_{c1} = \tan^{-1}[\{-b + (b^2 - 4ac)^{1/2}\}/2a] \quad (2)$$

wherein:

$a = R_w^2\tan^2\gamma_w(R_w + R_c)\{\tan^2(\Gamma + \delta)(R_w + R_c) - 2r_g/\cos(\Gamma + \delta) + 2(R_w + R_c)\}$ $b = 2R_w\tan\gamma_w[r_g^2(R_w + R_c)\{\tan(\Gamma + \delta) - \Gamma\}\tan(\Gamma + \delta) + R_w^2\tan^2\gamma_w(R_w+R_c)\tan^2(\Gamma + \delta) - r_g\{r_g^2(1 + \Gamma\tan(\Gamma + \delta)) + 2R_w^2\tan^2\gamma_w\}/\cos(\Gamma + \delta) + (R_w + R_c)\{2R_w^2\tan^2\gamma_w + 2r_g^2(1 + \Gamma\tan(\Gamma+\delta)) - r_g(R_w+R_c)/\cos(\Gamma+\delta)\}]$ $c = [r_g^2\{\tan(\Gamma+\delta)-\Gamma\} + R_w^2\tan^2\gamma_w\tan(\Gamma+\delta)]^2 - 2[r_g(R_w+R_c)/\cos(\Gamma+\delta) - r_g(1 + \Gamma\tan(\Gamma + \delta))\}] \times r_g^2(1 + \Gamma\tan(\Gamma+\delta)) + 2R_w^2\tan^2\gamma_w]$

[Formula 3]

$$\Psi(\text{tooth tip}) = \Psi(\text{tooth root}) \quad (3)$$

[Formula 4]

$$a'\tan^4\gamma_{co} + b'\tan^3\gamma_{co} + c'\tan^2\gamma_{co} + d'\tan\gamma_{co} + e' = 0 \quad (4)$$

FIG. 18

[Table 1]

| Z | m β | 2 | 6 | 10 |
|---|---|---|---|---|
| 20 | 10° | 9.163° | 9.048° | 9.017° |
| | 20° | 18.574° | 18.213° | 18.057° |
| | 30° | 27.843° | 27.323° | 27.017° |

METHOD OF WORKING A HELICAL GEAR BY GRINDING

BACKGROUND OF THE INVENTION

1. Field of the Invention

The present invention relates to a method of working a helical gear by grinding with a grindstone, more particularly to a method of working a helical gear capable of obtaining a proper crowing or relieving.

2. Description of the Prior Art

There are various method of working the helical gear such as those by cutting, forging, casting, etc., one of which is the method of working a helical gear by grinding. It is the method of forming a tooth profile by grinding with a grindstone and the following method of working the helical gear by grinding has been well known.

FIGS. 9 and 10 is a view showing the conventionally well-known method of grinding a helical gear.

The helical gear 1 to be ground indexes in the direction of the arrow A and a grindstone 2 is brought into contact therewith to form a tooth profile 3 by grinding. The grindstone 2 rotates on the y-axis (the axis of revolution of the grindstone) and is movable in the directions of the x-axis (the radial direction of the helical gear) and the y-axis (the direction of the tooth trace of the helical gear) in the figure.

In case of forming the tooth profile 3 by grinding with the grindstone 2, the helical gear 1 is turned in the direction of the arrow A by a helix angle while the grindstone 2 is moved in the direction of the z-axis in the figure. Thereafter the helical gear 1 is returned to the original position and the grindstone 2 is slightly displaced in the direction of the x-axis and the helical gear 1 is turned in the direction of the arrow A by the helix angle while the grindstone 2 increased in depth of cut is moved in the direction of the z-axis again. The grinding of the tooth profile 3 is performed by successively repeating this operation. Upon completion of forming a tooth profile 3 by grinding, the helical gear 1 indexes in the direction of the arrow A to allocate the grindstone on the position thereof at which next tooth should be formed, where the aforementioned operation is performed to form the next tooth profile 3 by grinding. The process of grinding the tooth profile 3 is not limited to that described above, but other processes may be employed such as grinding the portions between the teeth of the helical gear 1 bit by bit all over the outer circumference thereof while the helical gear 1 successively indexes so as to gradually deepening the concave portions to form the tooth profiles 3.

FIG. 11 shows an example of a tooth profile 3 which has been formed by grinding in such a way. The tooth profile 3 has the thicknesses D1, D2 and D3 which are respectively same on the contour lines all over the total length thereof in the tooth trace direction indicated by H1, H2 and H3. In case that the tooth profile 3 has the same thickness all over the tooth trace directional length H, there occurs uneven contact between the helical gears 1 when they are engaged each other, which results in the breakage of the tooth profile 3 or the generation of noise in operation.

In order to prevent the breakage of the tooth profile 3 set forth above and reduce the generation of noise, conventional helical gears 1 are provided with crowning or relieving on the tooth profiles 3 thereof. The crowing means the shape of the tooth profile 3 which is modified thinner in thickness (D) at the both ends of the tooth trace directional length H of the tooth profile 3 while gradually thicker toward the center thereof in thickness (D) as illustrated in FIG. 12.

The relieving means the shape of the tooth profile 3 which is modified thinner in thickness (D) at the both ends of the tooth trace directional length H of the tooth profile 3 while other portions remain the same in thickness (D) as illustrated in FIG. 13. The crowing and the relieving will be generically called "crowing etc." hereinafter. Conventional helical gears have prevented the uneven contact between them by forming the aforementioned crowing etc. thereon, thereby preventing the breakage of the tooth profile 3 and reducing the noise caused by the uneven engagement thereof.

Modifying methods such as those illustrated in FIGS. 14 and 15 are employed by the process of modifying the tooth profile for forming the crowing etc. set forth above.

That is, in the modifying method illustrated in FIG. 14, the helical gear 1 and the grindstone 2 is displaced along loci indicated by P1 and P2 in the figure respectively in the direction of the z-axis so as to deepen the bottoms of the tooth profiles 3 at both tooth trace directional ends thereof. In this way the tooth profile 3 can be reduced in thickness (D) at both tooth trace directional ends thereof as illustrated in FIGS. 12 and 13.

FIG. 15 shows the other modifying method of the tooth profile 3. That is, the grindstone 2 is kept in contact with the helical gear 1 at the tooth trace directional edge portion thereof as illustrated in FIG. 15 (a), and at that state the helical gear 1 is turned by a given angle θ left or right as illustrated in FIG. 15 (b) and FIG. 15 (c).

The processing methods of the helical gear 1 as set forth above have the following problems.

That is, in case of modifying the tooth profile such as the crowing etc., it is a matter of course that the modified shapes should be identical to each other at both tooth trace directional end portions of the tooth profile 3. However, the modified shapes do not become identical to each other at the both tooth trace directional end portions of the tooth profile 3 according to the conventional modifying methods such as the crowing etc. For example, the tooth profile is ground more at its crest but less at its root at one tooth trace directional end portion thereof, while it is ground less at its crest but more at its root at the other end portion thereof.

This phenomenon will be described in case of the relieving modification method as illustrated in FIG. 13. In FIG. 16, the tooth profile 3 is modified as indicated by G1 at one tooth trace directional end portion thereof, while it is modified as indicated by G2 at the other end portion thereof. As to the thickness (D) relative to the tooth trace directional length H, at the modified portion indicated by G1 the tooth profile 3 is ground more at the edge portion of the contour line H4 (crest) and gradually less from the edge portion of the contour line H5 (middle) toward that of the contour line H6 (root). On the other hand at the other modified portion indicated by G2, the tooth profile 3 is ground less at the edge portion of the contour line H4 (crest) and gradually more from the edge portion of the contour line H5 (middle) toward that of the contour line H6 (root). Accordingly, the crowing etc. are different in shape at both tooth trace directional end portions of the tooth profile 3, which results in an incomplete improvement of the problems of strength and noise caused by shape of the tooth profile 3.

SUMMARY OF THE INVENTION

Therefore, it is the object of the present invention to provide a method of grinding for modifying the helical gear such as crowing etc. so as to solve the problems of strength and noise set forth above by making the modified shapes of the tooth profile at both tooth trace directional end portions thereof to be identical to each other as much as possible. To achieve the above object, the method of working a helical gear by grinding with a grindstone according to the present invention is characterized in that the following inequality is established:

$$\gamma c < \beta$$

where $\beta$ is the helix angle of the helical gear to be ground, $\gamma c$ is the inclination angle of the grindstone and the grindstone has a profile having a vertical angle which is equal to the inclination angle ($\gamma c$).

With the arrangement set forth above, the present invention has the following effects.

Since the tooth trace directional length of the simultaneous contact line on which the grindstone contacts the tooth profile at a time in case of grinding the helical gear is small, the shapes of both tooth trace directional end portions of the tooth profile can be brought closer to those of the original design in modifying the tooth profile such as crowing or relieving, which prevents the conventional trouble of excessive error in shape.

Moreover, it is possible to perform a proper crowing or relieving in a single process, so that it is possible to speed up the grinding process.

BRIEF DESCRIPTION OF THE DRAWINGS

FIG. 1(c) is a view showing the cross sections of FGHI and F'G'H'I' in FIG. 1(a).

FIGS. 5(a), 5(b) and 5(c) show a schematic change of the simultaneous contact line K as the inclination angle ($\gamma c$) is gradually decreased from that approximately equal to the helical angle $\beta$.

FIG. 6 is a characteristic curve diagram showing the relation between the inclination angle ($\gamma c$) and the (L1–L3) and (L2–L3) in FIG. 5.

FIG. 17 contains thereon formulae 1 through 4.

FIG. 18 contains thereon Table 1.

PREFERRED EMBODIMENT OF THE INVENTION

An embodiment of the present invention will be described hereinafter.

The theoretical background of the present invention will be described before that.

The inventors of the present invention have investigated why the modified shapes of the tooth profile are different from each other at both tooth trace directional end portions thereof in the well-known conventional method of modifying the helical gear and obtained the following conclusion of the analytical research.

Figure 1:
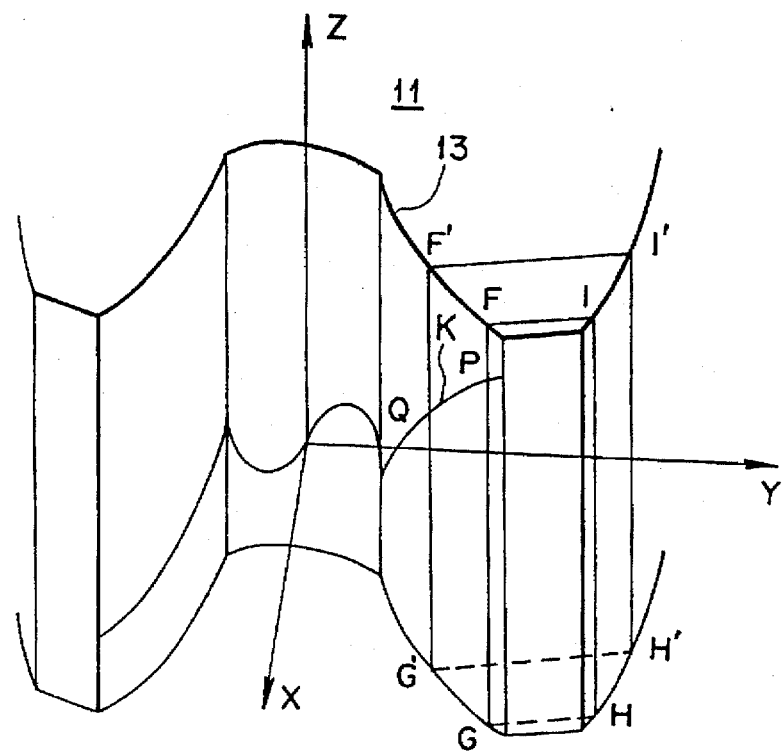
FIG. 1 is a view for explaining the difference in the radially ground amount of a helical gear which depends on a simultaneous contact line in case of grinding the helical gear with a grindstone, in which FIG. 1 (a) is an enlarged perspective view of a part of the helical gear, FIG. 1 (b) is a characteristic curve showing the simultaneous contact line on the z-y plane in FIG. 1(a)
Figure 1:
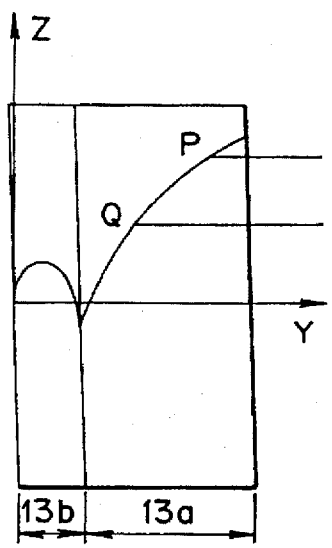
Figure 1:
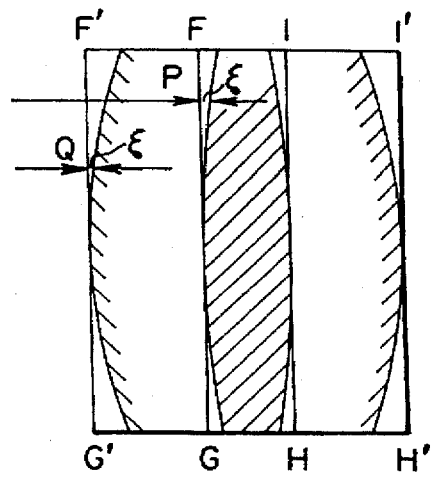

FIG. 1(a) is an enlarged perspective view of a part of a helical gear, in which the z-axis is defined vertically (the axis of revolution of the helical gear), the x-axis is defined in the direction intersecting the z-axis at right angles and passing the center of the space between the teeth (the direction intersecting the axis of revolution of the grindstone at right angles), and a y-axis is defined in the direction intersecting the z-axis and the x-axis at right angles. When the tooth profile 12 of such a helical gear 11 is modified at the tooth trace directional end portions thereof (crowing in this case), the grindstone, not shown, simultaneously contacts the tooth profile 12 at the line segment indicated by K in the figure. When the simultaneous contact line K is projected on the z-y plane, it forms a convex curve swelling out toward the z-axis as it goes to the tip of the tooth in the involute portion 12a of the tooth profile 12, while it forms a convex curve swelling out toward the z-axis in the fillet portion 12b as illustrated in FIG. 1(b). Supposing that the points at which the aforementioned simultaneous contact line K intersects the cross section FGHI adjacent to the tip end of the tooth and the cross section F'G'H'I' adjacent to the root thereof respectively, they appear as illustrated in FIG. 1(c). As evident from the figure, since the points P and Q are respectively on the simultaneous contact line, the modified amount $\epsilon$ of the tooth profile at the point P equals to that $\epsilon$ thereof at the point Q. Whereas the points P and Q are displaced in the direction of the z-axis, so that the tooth profile 12 is ground more at the tip portion and less at the root portion of a tooth trace directional end portion thereof, on the other hand, less at the tip portion and more at the root portion of the other tooth trace directional end portion thereof.

Therefore we learned that the simultaneous contact line K is preferable when it swells out less in the direction of the z-axis.

Figure 2A:
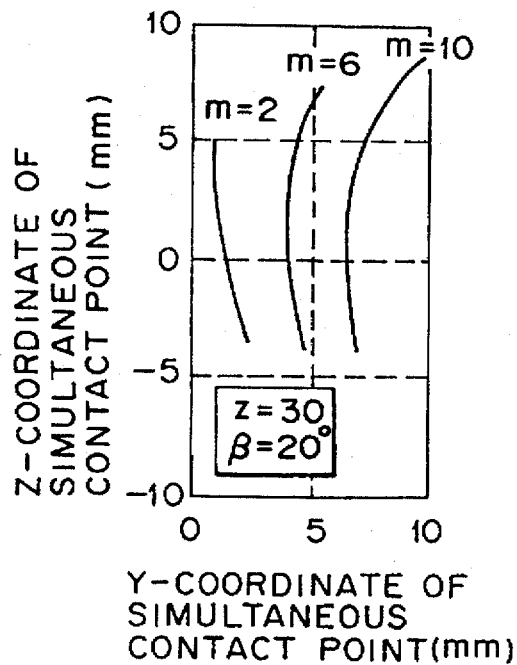
FIG. 2(a) is a characteristic curve diagram for analyzing the tooth trace directional (in the direction of the z-axis) extent of the simultaneous contact line K in which the number (z) of teeth is 30, the helical angle ($\beta$) is 20° and the modules (m) are: m=2, m=6 and m=10.

Accordingly, we obtained the simultaneous contact lines K by changing the module (m), the number of teeth (z) and the helical angle ($\beta$) as illustrated in FIG. 2(a) for analyzing the same.

That is, FIG. 2(a) is a characteristic curve diagram for analyzing the extent of the simultaneous contact line K in the direction of the tooth trace (the direction of the z-axis) when the number of teeth (z) is 30, the helical angle ($\beta$) is 20° and the modules (m): m=2, m=6 and m=10.

As understood from the figure, we learned that the smaller the module (m) is, the smaller the extent of the simultaneous contact line K is.

Figure 2B:
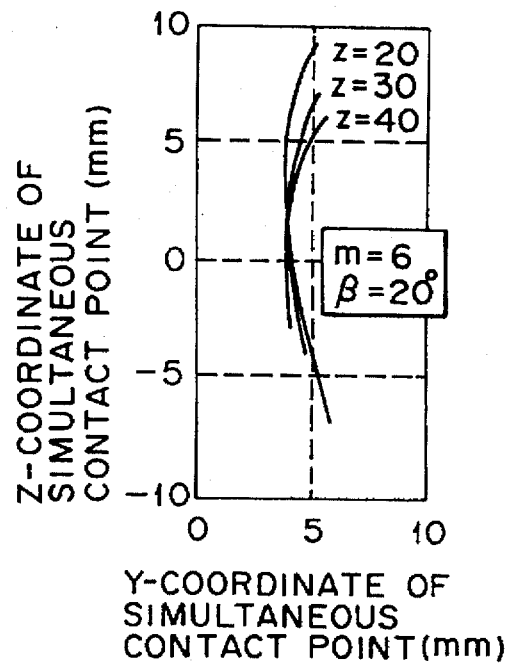
FIG. 2(b) is a characteristic curve diagram for analyzing the extent of the simultaneous contact line K in the direction of the z-axis in which the module (m) is 6, the helical angle ($\beta$) is 20° and the numbers of teeth (z) are: z=20, z=30 and z=40, and FIG. 2 (c) is a characteristic curve diagram for analyzing the extent of the simultaneous contact line K in the direction of the z-axis in which the module (m) is 6, the number (z) of teeth is 30 and the helical angles ($\beta$) are: $\beta$=30°, $\beta$=20°, $\beta$=10°.

FIG. 2(b) is a characteristic curve diagram for analyzing the extent of the simultaneous contact line K in the direction of the tooth trace (the direction of the z-axis) when the module (m) is 6, the helical angle ($\beta$) is 20° and the number of teeth (z) are: z=20, z=30 and z=40.

As understood from the figure, we learned that the larger the number of teeth (z), the smaller the extent of the simultaneous contact line K is.

Figure 2C:
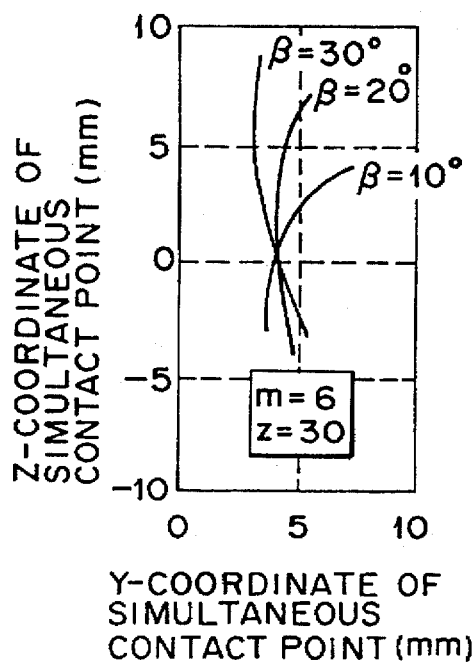
FIG. 2 shows a characteristic curve for explaining the difference of the extents of the simultaneous contact lines depending on the difference of the specifications of the helical gear. In the figure.

Moreover, FIG. 2(c) is a characteristic curve diagram for analyzing the extent of the simultaneous contact line K in the direction of the z-axis when the module (m) is 6, the number of teeth (z) is 30 and the helical angles ($\beta$) are: $\beta$=30°, $\beta$=20° and $\beta$=10°.

As understood from the figure, we learned that the smaller the helical angle ($\beta$) is, the smaller the extent of the simultaneous contact line K.

The extent of the simultaneous contact line K relative to the specifications of the grindstone will be analyzed hereinafter.

Figure 3:
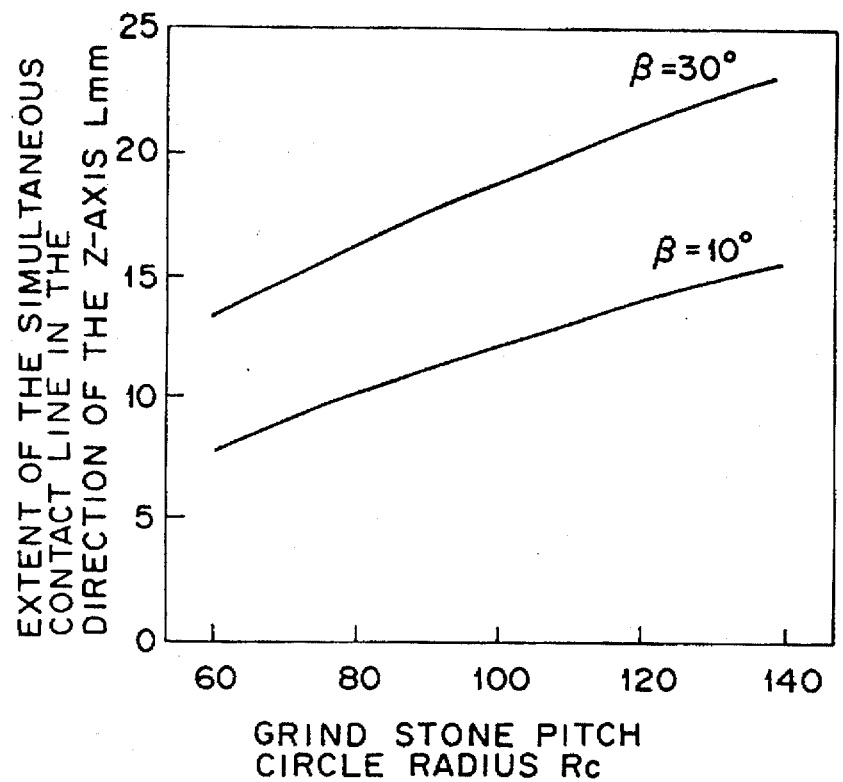
FIG. 3 shows characteristic curves representing the relations between the pitch circle radius (Rc) and the extent (L) of the simultaneous contact line K in the direction of the z-axis in which the helical angle ($\beta$) are: $\beta$=30° and $\beta$=10°.

FIG. 3 shows a characteristic curve representing the relation between the pitch circle radius (Rc) and the extent (L) of the simultaneous contact line K in the direction of the z-axis when the helical angles ($\beta$) are: $\beta$=30° and $\beta$=10°.

As understood from the figure, we learned that the smaller the pitch circle radius (Rc) is, the smaller the extent of the simultaneous contact line K is.

Figure 4:
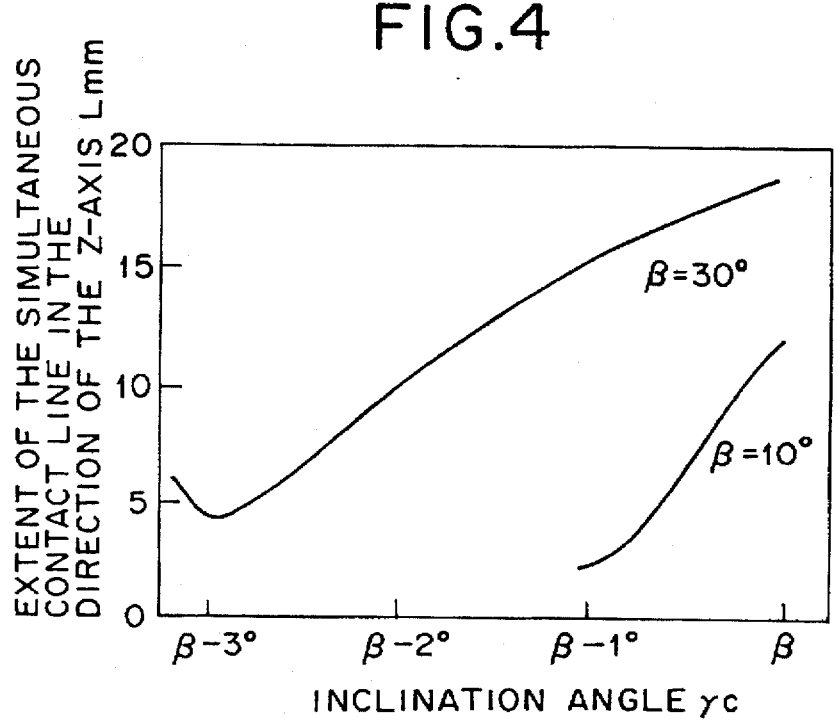
FIG. 4 shows characteristic curves representing the relations between the inclination angle ($\gamma c$) of the grindstone and the extent (L) of the simultaneous contact line K in the direction of the z-axis in which the module (m): m=10, the number of teeth (z): z=20, the pitch circle radius (Rc): Rc=100 mm, and the helical angles ($\beta$): $\beta$=30° and $\beta$=10°.

FIG. 4 shows characteristic curves representing the relations between the inclination angle ($\gamma$ c) and the extent of the simultaneous contact line K in the direction of the z-axis when the helical angles ($\beta$) are: $\beta$=30° and $\beta$=10°. In the characteristic curves, the module (m): m=10, the number of teeth (z): z=20 and the pitch circle radius (Rc): r=100 mm.

As understood from the figure, although the inclination angle ($\gamma$ c) is usually equal to the helix angle ($\beta$), we learned that the extent of the simultaneous contact line K is smaller in practice when the inclination angle ($\gamma$ c) is smaller than the helical angle ($\beta$) from this analysis. At that time we also learned that interference occurs when the inclination angle ($\gamma$ c) of the grindstone is too small.

As described above, we learned that a more proper crowing etc. can be obtained by determining the inclination angle ($\gamma$ c) properly small relative to the helix angle ($\epsilon$). As a result, we made further analysis how to actually obtain the optimum value ($\gamma$ $c_0$) of the inclination angle ($\gamma$ c) of the grindstone.

FIG. 5 shows the change of the simultaneous contact line K when the inclination angle ($\gamma$ c) of the grindstone is gradually decreased from the value adjacent to the helix angle ($\beta$).

In the FIG. 5(a), the simultaneous contact line K extends vertically in the direction of the z-axis with the upper end thereof at the tooth tip L1 and the lower end thereof at the tooth root L2. Accordingly, the extent L of the simultaneous contact line K is: L=L1–L2.

Thereafter, when the inclination angle ($\gamma$ c) of the grindstone is decreased a little from the state of FIG. 5(a) described above, the simultaneous contact line K is slightly bent upward at the tooth root L2, wherein the simultaneous contact line K is uppermost at the tooth tip thereof L1 while lowermost at the bending point thereof L3. Accordingly, the simultaneous contact line K of such a shape has a extent L: L=L1–L3.

Successively, when the inclination angle ($\gamma$ c) of the grindstone is further decreased slightly from the state of FIG. 5(b), the tooth root L2 of the simultaneous contact line K which has bent upward is further displaced upward, so that the simultaneous contact line K becomes uppermost at the tooth root L2, while lowermost at the bending point L3. Accordingly, the simultaneous contact line K of such a shape has a extent L: L–L2–L3.

From the values of extent of the simultaneous contact line K set forth above, i.e., (L1–L2), (L1–L3) and (L2–L3), it is understood that at least the following inequalities are established.

(L1–L2)>(L1–L3) or (L1–L2)>(L2–L3)

As a result, it is understood that, in order to obtain the minimum value of the simultaneous contact line K, it is enough to obtain the minimum value of the aforementioned (L1–L2) and (L2–L3) by way of studying the change thereof relative to the inclination angle ($\gamma$ c).

FIG. 6 is a characteristic curve diagram showing the relation between the inclination angle ($\gamma$ c) of the grindstone and the aforementioned (L1–L2) and (L2–L3), in which the inclination angle ($\gamma$ $c_0$) of the grindstone at the point where the curve (L1–L3) intersects the curve (L2–L3) corresponds to the minimum value of the simultaneous contact line K. In other words, the intersecting point indicates that the tooth tip and the tooth root is equal to each other in the z-coordinate.

On the basis of the description set forth above, the inclination angle ($\gamma$ $c_0$) of the grindstone for minimizing the extent of the simultaneous contact line K will be obtained from the following formula.

The following formula employs the following symbols.

X: the common normal line axis of the axis (the z-axis) of the helical gear and the axis (the $\zeta$-axis) of the grindstone Y: the axis in the direction intersecting the x- and z- axes of the helical gear at right angles Z: the axis of the helical gear (the axis of revolution)

Figure 7:
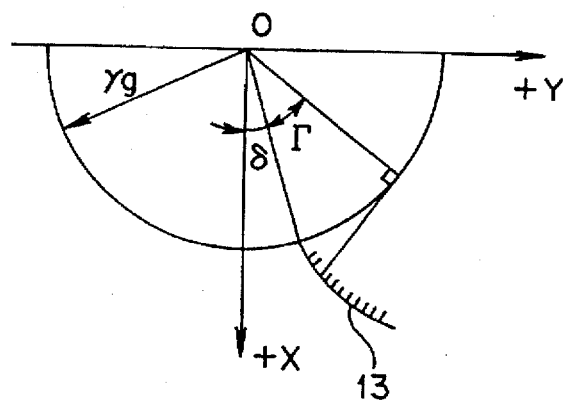
FIG. 7 is a view showing $\Gamma$ and $\delta$ representing the outline of the tooth profile 3 for obtaining a formula.

$\zeta$: the common normal line axis of the axis (the $\zeta$-axis) of revolution of the grindstone and the axis (the z-axis) of the helical gear ζ: the axis (the axis of revolution) of the grindstone.

η: the axis intersecting the axis (the ζ-axis) of revolution of the grindstone and the ζ-axis Rw: the pitch circle radius of the helical gear Rc: the pitch circle radius of the grindstone γw: the head angle (90°−γ) of the helical gear β: the helix angle of the helical gear γc: the inclination angle of the grindstone φ: the angle of revolution on the z-axis At first, when the tooth profile 3 of the helical gear as illustrated in FIG. 7 is given, the parameter φ of the angle of revolution on the z-axis of the helical gear for determining the shape of the grindstone corresponding to an arbitrary point on the tooth profile obtained by changing the value of Γ is approximately given by the formula (1) in [Formula 1].

In the formula (1), as the value of the inclination angle (γc) becomes small, the value of φ cannot be obtained. That is, there occurs the phenomenon of interference. Since the interference is liable to occur toward the tooth root side of the involute portion of the tooth profile, the limit value ($\gamma c_1$) of the inclination angle (γ c) of the grindstone at which the interference occurs is determined from the formula (2) which is shown in [Formula 2] using the value of Γ at the lowest position of the involute portion on condition that $B^2 - AC = 0$ is established in the formula (1).

As described already, since the simultaneous contact line K have a same coordinate value in the z-coordinate at the tip and root thereof when the extent thereof is at minimum, the formula (3) as shown in [Formula 3] is established.

Accordingly, the formula for the optimal inclination angle ($\gamma c_0$) of the grindstone at which the extent of the simultaneous contact line K is at minimum is rewritten as the formula (4) as shown in [Formula 4] on condition of the formulas (1) and (3).

The optimal inclination angle ($\gamma c_0$) of the grindstone which is the minimum value of the inclination angle (γ c) of the grindstone obtained from the formula (4) and the inclination angle ($\gamma c_1$) of the grindstone at which the interference occurs have to meet the inequality $\gamma c_0 > \gamma c_1$, and if they do not or the solution of the formula (4) itself does not exist the optimal inclination angle ($\gamma c_0$) of the grindstone becomes: $\gamma c_0 = \gamma c_1$.

An example of the optimal inclination angle ($\gamma c_0$) of the grindstone obtained from the aforementioned formula is shown in Table 1.

As understood from the Table 1, the optimal inclination angle ($\gamma c_0$) of the grindstone is smaller than the helix angle (β) of 10° by about 0.85°. The optimal inclination angle ($\gamma c_0$) of the grindstone gets smaller little by little as the module (m) gets larger.

Figure 8:
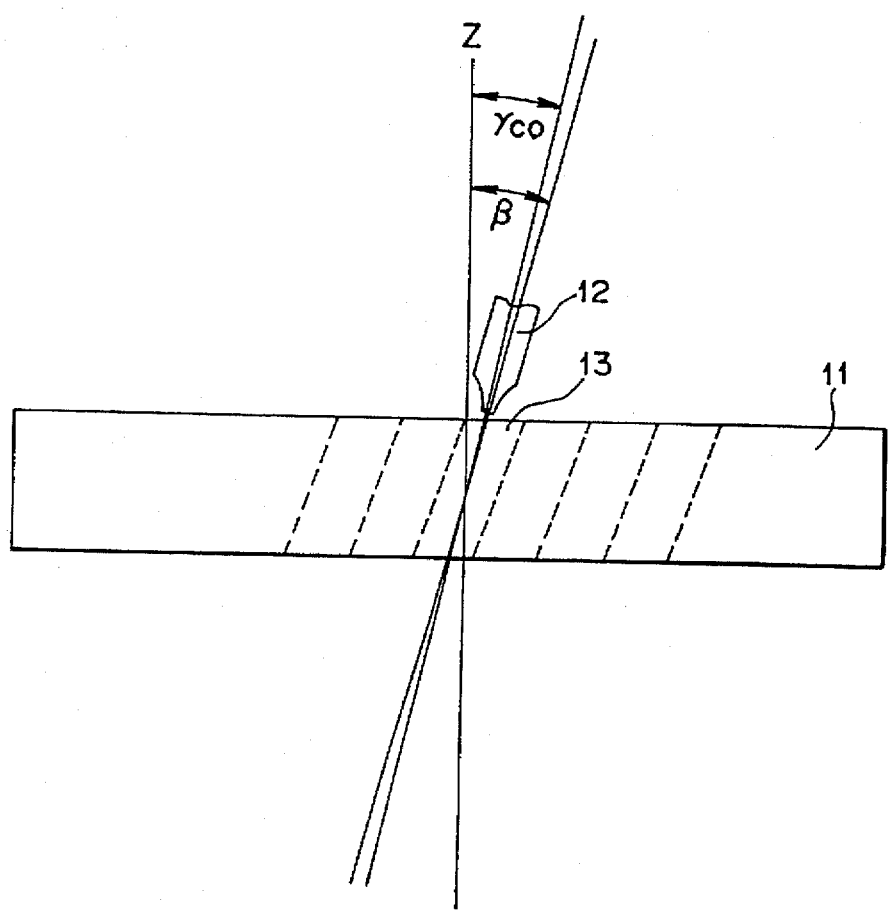
FIG. 8 is a schematic plan view showing an embodiment of the present invention.
Figure 9:
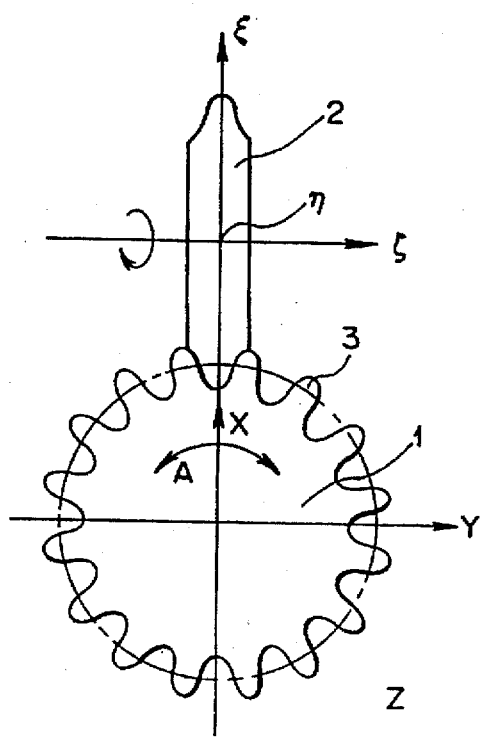
FIG. 9 is a front view showing a well-known conventional method of grinding a helical gear.
Figure 10:
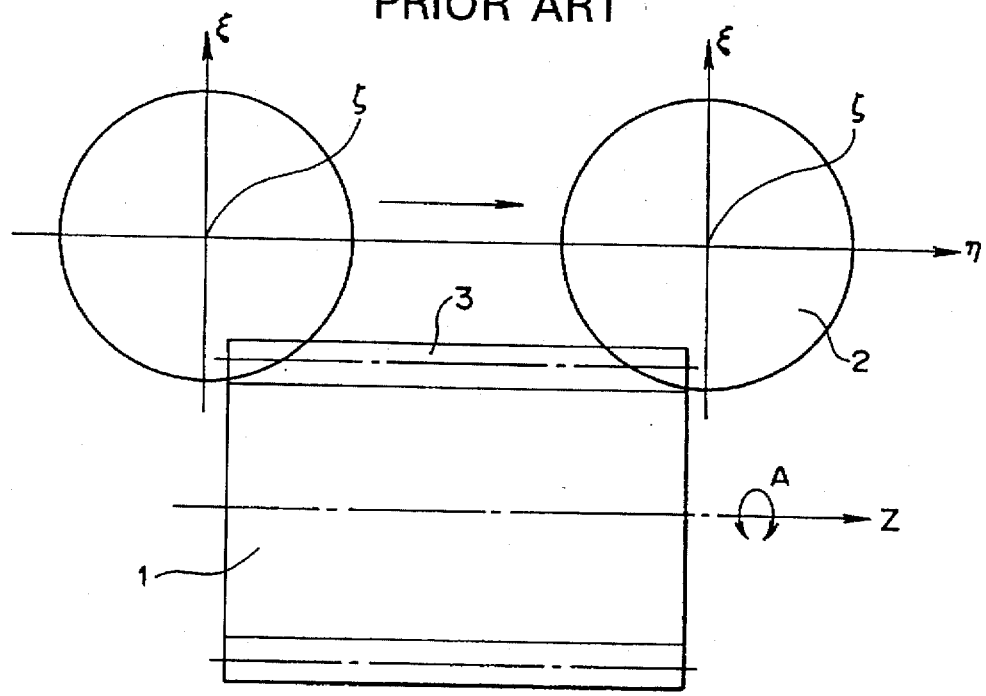
FIG. 10 is a side view showing the movement of the grindstone.
Figure 11:
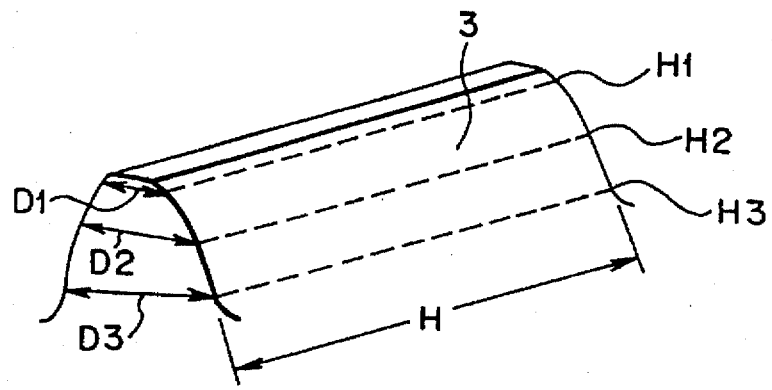
FIG. 11 is a view showing an example of a tooth profile formed by a conventional method of grinding.
Figure 12:
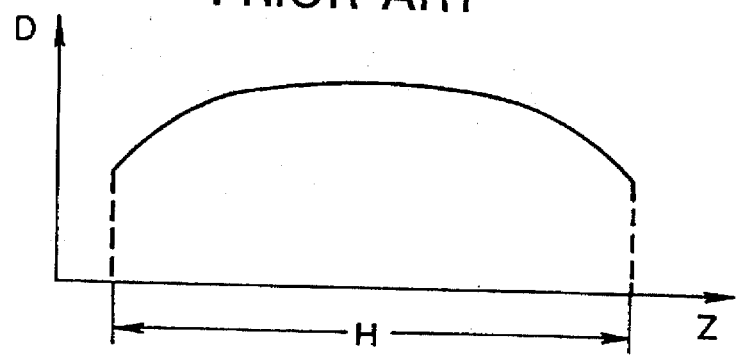
FIG. 12 is a view for explaining a crowing formed on the tooth profile by a characteristic curve representing the change of thickness in the direction of the tooth trace, in which the axis of ordinate represents the thickness of the tooth profile while the axis of abscissa represents the length of the tooth profile in the direction of the tooth trace.
Figure 13:
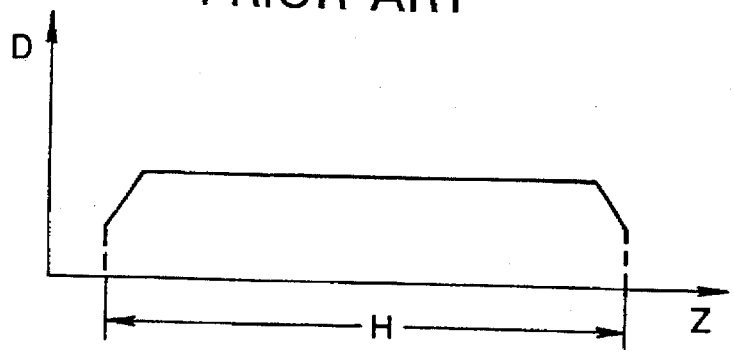
FIG. 13 is a view for explaining the relieving formed on the tooth profile by a characteristic curve representing the change of thickness in the direction of the tooth trace, in which the axis of ordinate represents the thickness (D) of the tooth profile while the axis of abscissa represents the length of the tooth profile in the direction of the tooth trace.
Figure 14:
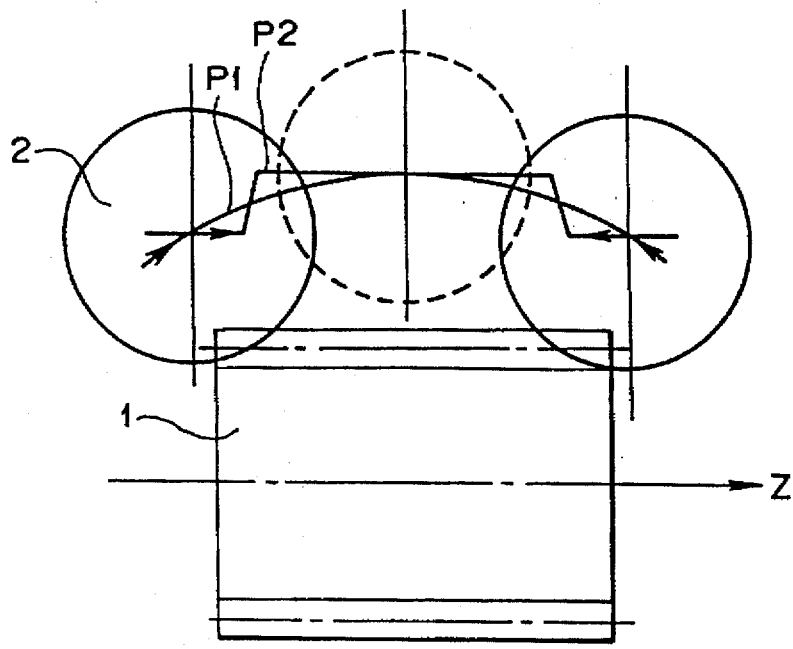
FIG. 14 is a view for explaining an example of conventional modification methods such as crowing etc.
Figures 15A, 15B, 15C:
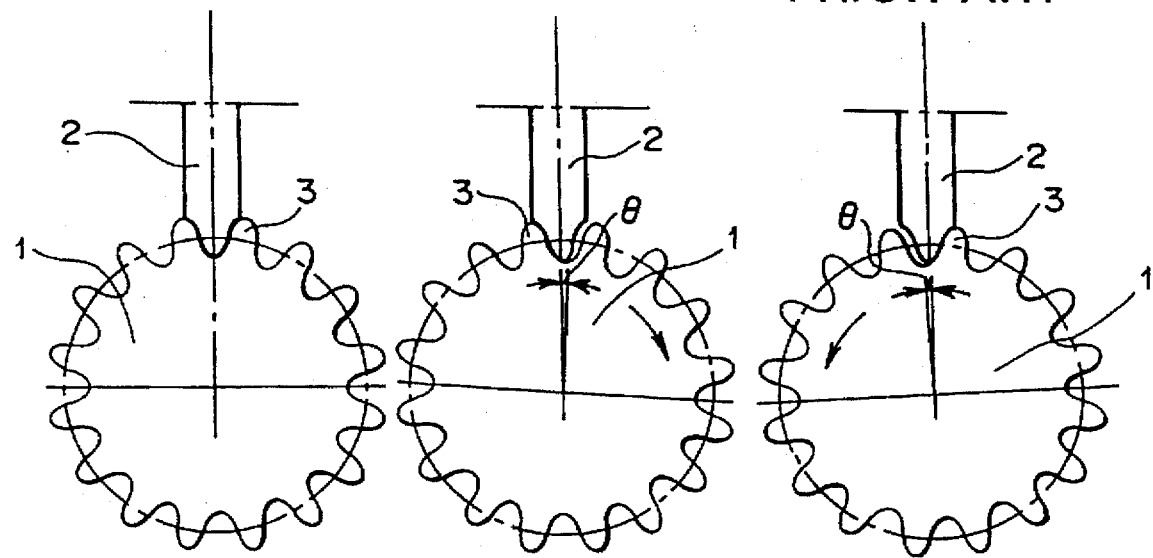
FIGS. 15(a), 15(b) and 15(c) are views for explaining the other example of conventional modification methods such as crowing etc.
Figure 16:
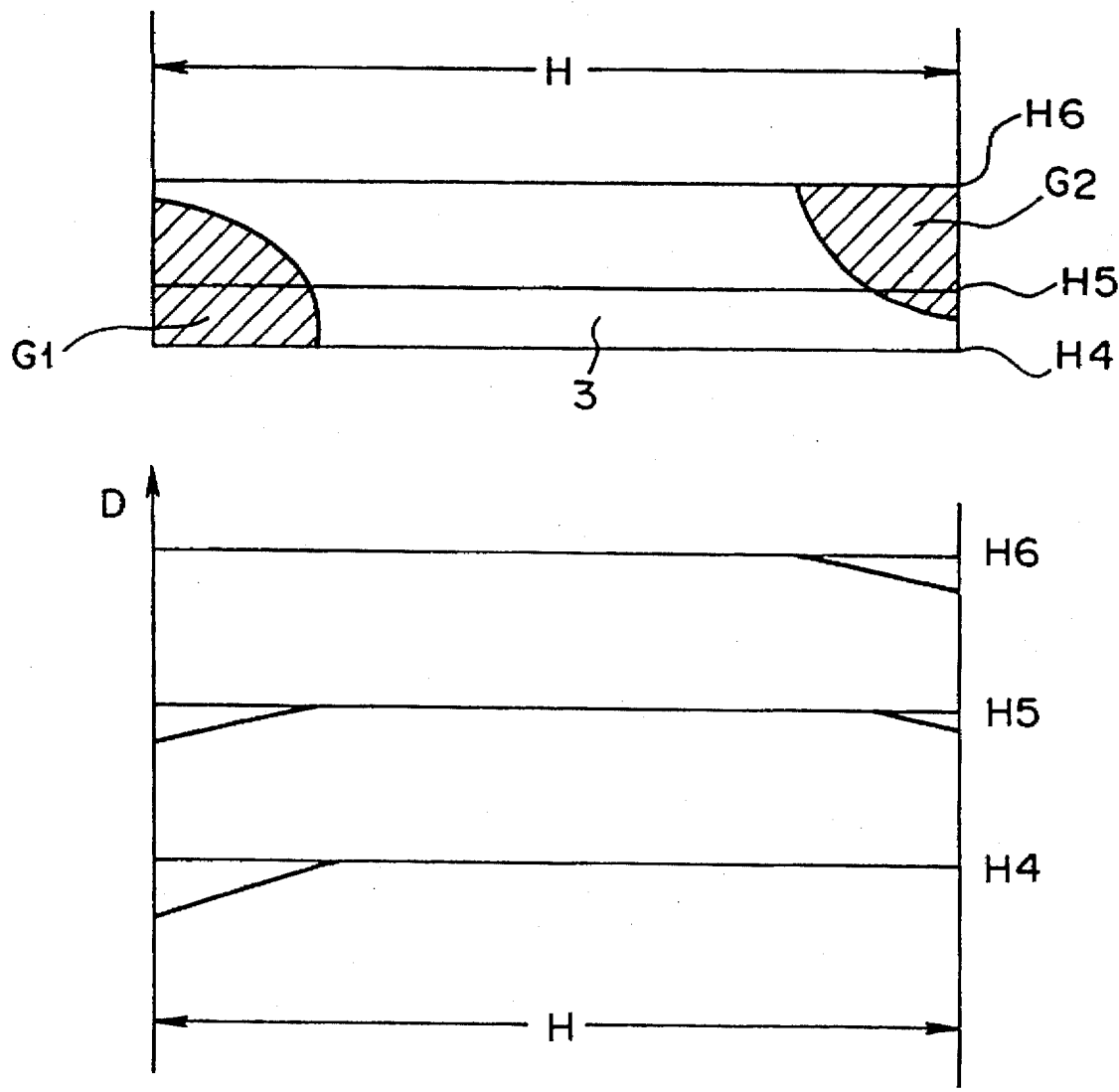
FIG. 16 is a view for explaining an example of a tooth profile formed by a conventional modification method such as crowing etc.

The process of grinding the helical gear using the result of the analysis described above will be described hereinafter with reference to FIG. 8.

In case of grinding a helical gear 11 having a helix angle (β) of 20° and a module (m) of 6 with a grindstone 12, the optimal inclination angle (γ $c_0$) of the grindstone is 18.213° in Table 1. The cutter shape of the grindstone 12 is determined supposing that the inclination angle of the grindstone 12 is 18.213°. Whereupon the extent of the simultaneous contact line K in the direction of the z-axis becomes small so that the shapes of the tooth profile 13 at both tooth trace directional end portions thereof become proper when a modification such as crowing etc. is performed to the tooth profile with the grindstone 12. As described above, a proper modification such as crowing etc. can be performed to the tooth profile by setting the inclination angle of the grindstone a little smaller than the helix angle of the helical gear according to the method of grinding a helical gear of the present invention.

According to the method of grinding of the present invention, the extent of the simultaneous contact line on which the grindstone contacts the helical gear becomes small in the direction of the tooth trace. Accordingly, the extent of the simultaneous contact line is also small at the positions adjacent to the tooth trace directional end portions of the helical gear, so that the modification such as crowing or relieving is improved in accuracy as much.

What is claimed is:

1. A method for forming gear teeth on an outer circumferential surface of a helical gear by grinding with a grindstone, said helical gear having a helix angle (β) measured relative to an axis of revolution of said helical gear and each of said gear teeth having a radial axis extending radially outwardly away from said axis of revolution, the method comprising the steps of:

selecting an inclination angle (γc) of said grindstone which is defined relative to said axis of revolution of said helical gear;

positioning said grindstone proximate said helical gear at said inclination angle (γc) which is less than said helix angle (β) such that γc<β;

providing the grindstone with a profile having an angle inclined relative to said radial axis of said gear tooth being formed which is equal to said inclination angle (γc) of said grindstone; and grinding said helical gear with said grindstone to form said gear teeth on said outer circumferential surface of said helical gear said grinding including the steps of moving said grindstone in a direction transverse to a circumferential direction of said outer circumferential surface to grind said helical gear and indexing said grindstone and said helical gear circumferentially one relative to the other.

2. The method according to claim 4, wherein said grindstone defines a simultaneous contact line (K) on a gear tooth surface being formed by said grinding, said simultaneous contact line being a line segment by which said grindstone simultaneously contacts a tooth profile defined by said gear tooth surface, a boundary inclination angle ($\gamma c_1$) being defined relative to said axis of revolution and defining the angle at which said simultaneous contact line causes interference when said inclination angle (γc) is less than said helix angle (β), said grindstone being positioned such that said inclination angle (γc) is defined by the inequality $\beta > \gamma c \geq \gamma c_1$.

3. The method according to claim 1, wherein said grindstone defines a simultaneous contact line (K) on a gear tooth surface being formed by said grinding, said simultaneous contact line being a line segment by which said grindstone simultaneously contacts a tooth profile defined by said gear tooth surface, said inclination angle (γc) being equal to an optimal inclination angle ($\gamma c_0$) defined relative to said axis of revolution, said optimal inclination angle ($\gamma c_0$) being the angle at which an extent of said simultaneous contact line (K) is minimized when said inclination angle (γc) is smaller than said helix angle (β).

4. A method for forming a helical gear by grinding with a grindstone to form circumferentially spaced gear teeth on an outer circumferential surface thereof, said helical gear having a helix angle (β) measured relative to an axis of revolution of said helical gear, the method comprising the steps of:

selecting said helix angle for said gear teeth;

selecting an inclination angle ($\gamma c$) of said grindstone which is defined relative to said axis of revolution of said helical gear;

positioning said grindstone proximate said circumferential surface of said helical gear at said inclination angle ($\gamma c$) which is less than said helix angle ($\beta$) such that $\gamma c < \beta$;

rotating said grindstone about an axis of rotation thereof, said axis of rotation of said grindstone being oriented transverse to said axis of rotation of said helical gear; and grinding said circumferential surface of said helical gear with said rotating grindstone to form said gear teeth on said circumferential surface of said helical gear said grinding including the steps of moving said grindstone in a direction transverse to a circumferential direction of said circumferential surface to grind said helical gear and indexing said grindstone and said helical gear circumferentially one relative to the other.

5. The method according to claim 4, wherein said grindstone defines a simultaneous contact line (K) on a gear tooth surface being formed by said grinding, said simultaneous contact line being a line segment by which said grindstone simultaneously contacts a tooth profile defined by said gear tooth surface, a boundary inclination angle ($\gamma c_1$) being defined relative to said axis of revolution of said helical gear and defining the angle at which said simultaneous contact line causes interference when said inclination angle ($\gamma c$) is less gear than said helix angle ($\beta$), said grindstone being positioned such that said inclination angle ($\gamma c$) is defined by the inequality $\beta > \gamma c \geq \gamma c_1$.

6. The method according to claim 4, wherein said grindstone defines a simultaneous contact line (K) on a gear tooth surface being formed by said grinding, said simultaneous contact line being a line segment by which said grindstone simultaneously contacts a tooth profile defined by said gear tooth surface, said inclination angle ($\gamma c$) being equal to an optimal inclination angle ($\gamma c_0$) defined relative to said axis of revolution of said helical gear, said optimal inclination angle ($\gamma c_0$) being the angle at which an extent of said simultaneous contact line (K) is minimized when said inclination angle ($\gamma c$) is smaller than said helix angle ($\beta$).

7. The method according to claim 4, wherein each of said gear teeth having a radial axis extending radially outwardly away from said axis of rotation, said method further including the step of providing the grindstone with a profile having an angle inclined relative to said radial axis of said gear toot being formed which is equal to said inclination angle ($\gamma c$) of said grindstone.

* * * * *

UNITED STATES PATENT AND TRADEMARK OFFICE
CERTIFICATE OF CORRECTION

PATENT NO. : 5 681 207
DATED : October 28, 1997
INVENTOR(S) : Noriteru Nishida et al It is certified that error appears in the above-indentified patent and that said Letters Patent is hereby corrected as shown below:

Column 8, line 33; after "gear" insert ---,---.
line 39; change "claim 4," to ---claim 1,---.

Column 9, line 15; change "gear said" to
---gear, said---.

Column 10, line 4; delete "gear".
line 23; change "toot" to ---tooth---.

Signed and Sealed this

Thirty-first Day of March, 1998

Attest:

BRUCE LEHMAN

Attesting Officer

Commissioner of Patents and Trademarks